United States Patent
Zhou et al.

(10) Patent No.: US 7,274,758 B1
(45) Date of Patent: Sep. 25, 2007

(54) COARSE FREQUENCY ESTIMATION IN AN OFDM RECEIVER BASED ON AUTOCORRELATION OF ACCUMULATED SAMPLES

(75) Inventors: Xu Zhou, Sunnyvale, CA (US); Chien-Meen Hwang, San Jose, CA (US); Yong Li, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 685 days.

(21) Appl. No.: 10/768,073

(22) Filed: Feb. 2, 2004

(51) Int. Cl.
*H03D 1/00* (2006.01)
(52) U.S. Cl. ...................................... 375/343; 375/344
(58) Field of Classification Search ................ 375/343, 375/344, 319
See application file for complete search history.

(56) References Cited

U.S. PATENT DOCUMENTS

| | | | | |
|---|---|---|---|---|
| 2002/0065047 | A1* | 5/2002 | Moose | 455/63 |
| 2004/0005018 | A1* | 1/2004 | Zhu et al. | 375/340 |
| 2005/0025264 | A1* | 2/2005 | Chen | 375/346 |

OTHER PUBLICATIONS

Moose "A technique for orthogonal frequency division multiplexing frequency offset correction", IEEE Transactions on Communications, vol. 42, Issue 10, Oct. 1994 pp. 2908-2914.*
Jian Li, "Carrier frequency offset estimation for OFDM-based WLANs", IEEE Signal Processing Letters, vol. 8, Issue 3, Mar. 2001 pp. 80-82.*
IEEE Std. 802.11a-1999, "Part 11: Wireless LAN Medium Access Control (MAC) and Physical Layer (PHY) specifications: High-speed Physial Layer in the 5 GHZ Band", L.AN/MAN Standards Committee of the IEEE Computer Society, IEEE-SA Standards Board, Approved Sep. 16, 1999, New York, USA.

* cited by examiner

*Primary Examiner*—Temesghen Ghebretinsae
*Assistant Examiner*—Juan Alberto Torres
(74) *Attorney, Agent, or Firm*—Manelli Denison & Selter PLLC; Leon R. Turkevich

(57) ABSTRACT

An OFDM receiver has an autocorrelation circuit configured for generating an autocorrelation result from samples of received short preamble symbols in a received data packet, where the autocorrelation circuit generates each autocorrelation result based on accumulation of the samples having been received for the short preamble symbols. Hence, by using all received samples of the short preamble symbols, the autocorrelation based on accumulated samples minimizes the effect of noise and provides a more accurate coarse frequency estimation result.

9 Claims, 3 Drawing Sheets

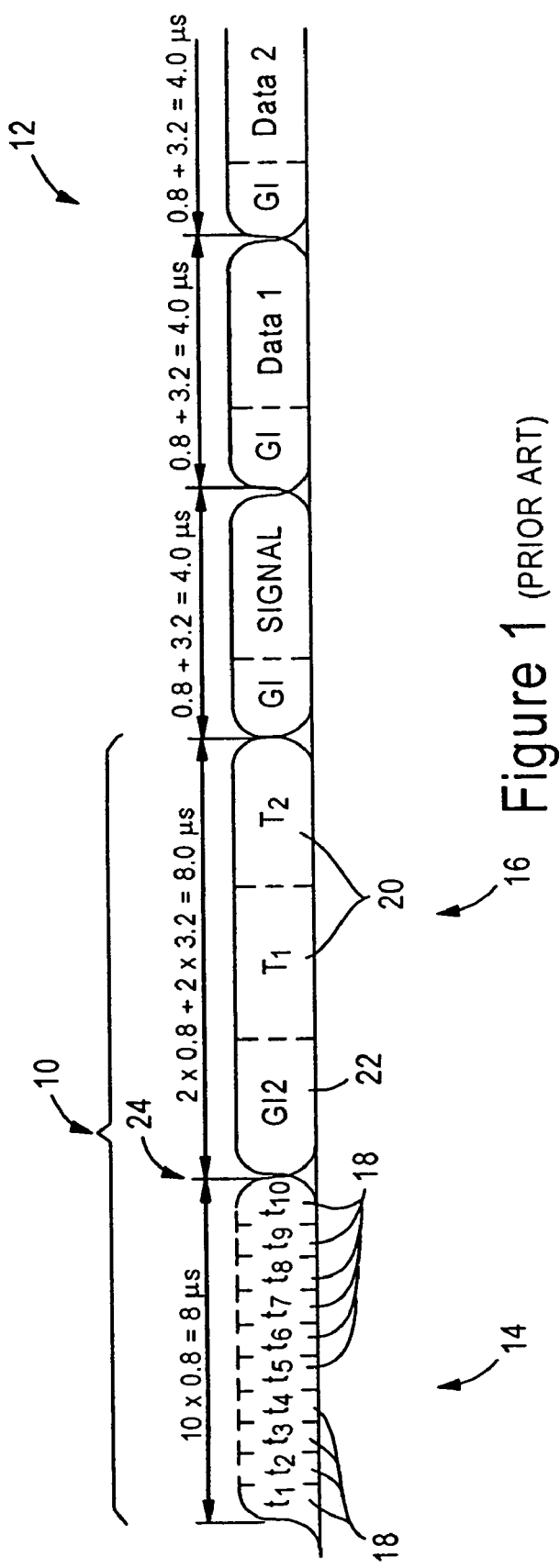
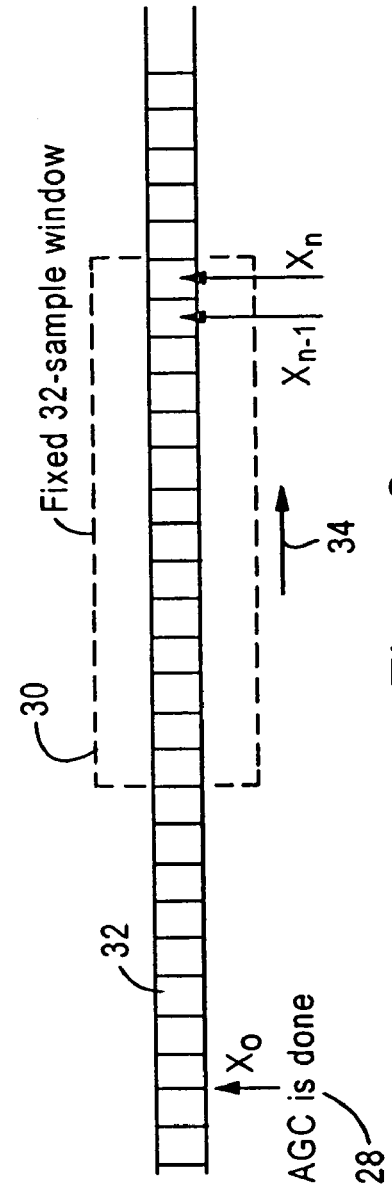

US 7,274,758 B1

COARSE FREQUENCY ESTIMATION IN AN OFDM RECEIVER BASED ON AUTOCORRELATION OF ACCUMULATED SAMPLES

BACKGROUND OF THE INVENTION

1. Field of the Invention

The present invention relates to coarse frequency estimation of signals, having been transmitted by an IEEE 802.11a based Orthogonal Frequency Division Multiplexing (OFDM) transmitter, by an OFDM receiver for correction of frequency errors in the received OFDM signals.

2. Background Art

Local area networks historically have used a network cable or other media to link stations on a network. Newer wireless technologies are being developed to utilize OFDM modulation techniques for wireless local area networking applications, including wireless LANs (i.e., wireless infrastructures having fixed access points), mobile ad hoc networks, etc. In particular, the IEEE Standard 802.11a, entitled "Wireless LAN Medium Access Control (MAC) and Physical Layer (PHY) specifications: High-speed Physical Layer in the 5 GHz Band", specifies an OFDM PRY for a wireless LAN with data payload communication capabilities of up to 54 Mbps. The IEEE 802.11a Standard specifies a PHY system that uses fifty-two (52) subcarrier frequencies that are modulated using binary or quadrature phase shift keying (BPSK/QPSK), 16-quadrature amplitude modulation (QAM), or 64-QAM.

Hence, the IEEE Standard 802.11a specifies an OFDM PHY that provides high speed wireless data transmission with multiple techniques for minimizing data errors.

A particular concern in implementing an IEEE 802.11a based OFDM PHY in hardware involves providing a cost-effective, compact device that can be implemented in smaller wireless devices. Hence, implementation concerns typically involve cost, device size, and device complexity.

One particular concern involves frequency differences ($f_E$) between the transmit frequency ($f_T$) generated by a local crystal oscillator in the OFDM transmitter and the receive frequency ($f_R$) generated by the local crystal oscillator in the OFDM receiver. The resulting frequency error ($f_E=f_T-f_R$) may cause substantial deterioration of the signal to noise ratio if left uncorrected.

The IEEE Standard 802.11a specifies a short preamble and a long preamble that may be used by the OFDM receiver for generating an estimated frequency error ($f_{EST}$). In actual implementation, however, the estimated frequency error ($f_{EST}$) does not equal the actual frequency error ($f_E$) because both the short preamble and long preamble contain noise components from transmission between the OFDM transmitter and the OFDM receiver. Hence, the short preamble and long preamble received by the OFDM receiver differs from the short preamble and long preamble output by the OFDM transmitter.

FIG. 1 is a diagram of a preamble 10 used by an OFDM receiver for synchronization with an 802.11a OFDM packet 12, reproduced from FIG. 110 (Section 17.3.3) of the IEEE Standard 802.11a. In particular, the preamble 10 is a Physical Layer Convergence Procedure (PLCP) preamble having a first training portion (i.e., a short preamble) 14 and a second training portion (i.e., a long preamble) 16. The first training portion 14, typically used for signal detection, automatic gain control, diversity selection, coarse frequency offset estimation, and timing synchronization, includes ten (10) identical short preamble symbols ($t_1, t_2, \ldots t_{10}$) 18; each short preamble symbol 18 is implemented as a 16-sample symbol. The second training portion 16 includes long training symbols ($T_1$ and $T_2$) 20 and a guard interval (GI2) 22. The second training portion 16 typically is used for channel and fine frequency offset estimation.

FIG. 2 is a diagram illustrating a typical approach in performing a coarse frequency estimation in a conventional 802.11a system. In particular, after automatic gain control (AGC) has been performed by the OFDM receiver at event 28, coarse frequency estimation is performed by performing autocorrelation on the short preamble samples 32 using a fixed-size (e.g., 32 sample) correlation window 30 over the short preamble samples 32, where each short preamble symbol 18 includes sixteen (16) samples 32. As illustrated in FIG. 2, the first usable sample following AGC completion at event 28 is the sample $x_0$: the fixed-size window 30 shifts in the direction 34 as new samples (e.g., $x_n$) 32 are received by the OFDM receiver. Hence, the autocorrelation result A(n) is performed according to:

$$A(n) = \sum_{k=0}^{15} x_{n-k}(x_{n-k-16})^* \quad (1)$$

Where the symbol "*" represents a complex conjugate (i.e., x* is the complex conjugate of x).

The above-described approach of using a fixed-size window 30 for autocorrelation to determine coarse frequency estimation suffers from the disadvantage that the short preamble samples 32 may have different values due to noise, adversely affecting the accuracy of the coarse frequency estimation in noisy conditions.

SUMMARY OF THE INVENTION

There is a need for an arrangement that enables a direct conversion receiver to provide improved coarse frequency estimation accuracy for improved reception of OFDM signals.

These and other needs are attained by the present invention, where an OFDM receiver has an autocorrelation circuit configured for generating an autocorrelation result from samples of received short preamble symbols in a received data packet, where the autocorrelation circuit generates each autocorrelation result based on accumulation of the samples having been received for the short preamble symbols. Hence, by using all received samples of the short preamble symbols, the autocorrelation based on accumulated samples minimizes the effect of noise and provides a more accurate coarse frequency estimation result.

One aspect of the present invention provides a method in an OFDM direct conversion receiver. The method includes receiving OFDM symbols, including short preamble symbols each having a prescribed number of short preamble samples, and performing a coarse frequency estimation based on autocorrelating an accumulation of the short preamble samples. The autocorrelating including increasing a correlation window for each received short preamble sample.

Another aspect of the present invention provides an OFDM direct conversion receiver configured for receiving OFDM symbols, including short preamble symbols each having a prescribed number of short preamble samples. The OFDM direct conversion receiver includes a coarse frequency estimation circuit configured for generating coarse frequency estimation values based on the received short preamble samples. The coarse frequency estimation circuit includes a correlator configured for generating each coarse frequency estimation value based on autocorrelating an accumulation of the received short preamble samples by successively increasing a correlation window for each corresponding received short preamble sample. The OFDM direct conversion receiver also includes means for adjusting the OFDM symbols based on the coarse frequency estimation values.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein:

FIG. 1 is a diagram illustrating a (PRIOR ART) preamble of a packet according to the IEEE 802.11a specification.

FIG. 2 is a diagram illustrating the conventional (PRIOR ART) technique of performing coarse frequency estimation using a fixed-sized correlation window.

BEST MODE FOR CARRYING OUT THE INVENTION

The disclosed embodiment will be described with reference to an overview of an IEEE 802.11a OFDM transceiver, followed by a detailed description of the generation of an autocorrelation result based on a successively increased window size, according to an embodiment of the present invention.

Receiver Architecture Overview

Figure 3:
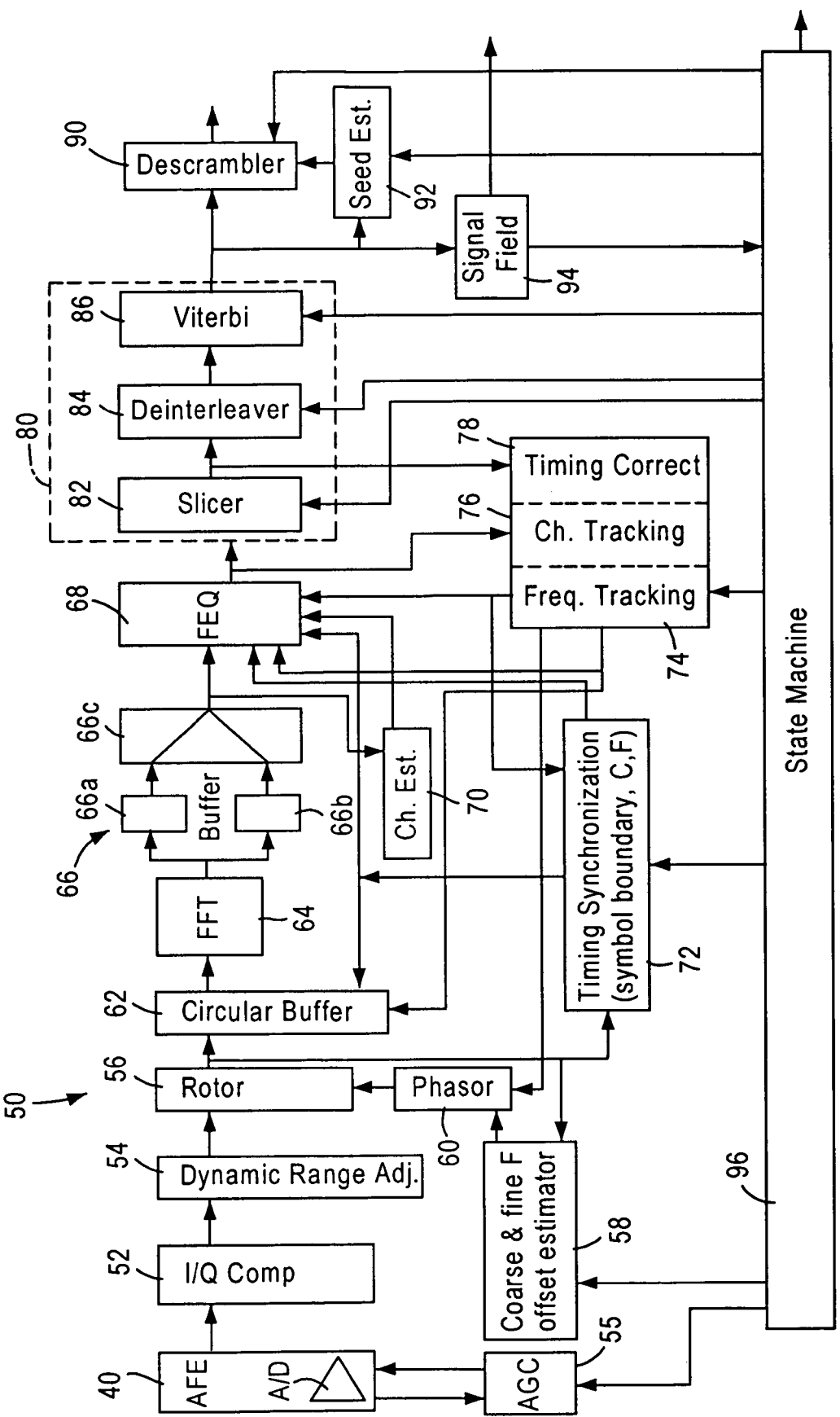
FIG. 3 is a diagram illustrating a receiver portion of an IEEE 802.11a OFDM transceiver according to an embodiment of the present invention.

FIG. 3 is a diagram illustrating an architecture of a receiver module 50 of an IEEE 802.11a Orthogonal Frequency Division Multiplexing (OFDM) transceiver, according to an embodiment of the present invention. The receiver module 50, implemented as a digital circuit, includes an I/Q mismatch compensation module 52 that receives detected wireless signal samples (in digital form) from an R/F analog front end (AFE) amplifier 40 having an analog to digital (A/D) converter. The gain of the AFE amplifier 40 is controlled by an AGC module 55. The detected wireless signal samples include an I component and Q component: these I and Q components, which ideally should be orthogonal to each other and have a uniform relative gain, may in fact have a non-orthogonal phase difference (i.e., other than 90 degrees) and have an unequal gain. Hence, the I/Q mismatch compensation module 52 is configured for compensating the mismatched I/Q components to generate compensated signal samples having matched I/Q components with orthogonal phase difference and a uniform relative gain.

The receiver module 50 also includes a dynamic range adjustment module 54. The dynamic range adjustment module 54 is configured for adjusting the gain of the compensated signal samples to a prescribed dynamic range for optimized signal processing, thereby outputting adjusted signal samples according to the prescribed dynamic range.

The rotor circuit 56 is configured for compensating between a local receiver carrier frequency (i.e., local oscillator) and the remote transmitter carrier frequency (i.e., remote oscillator) used to transmit the wireless signal. In particular, the course/fine frequency offset estimator 58 is configured for estimating the difference in the frequency between the local receiver carrier frequency and the remote receiver carrier frequency, and supplying this difference to a phasor circuit 60; the phasor circuit 60 converts the difference value to a complex phasor value (including angle information) which is supplied to the rotor circuit 56. Hence, the rotor circuit 56 rotates the adjusted signal samples based on the complex phasor value, and outputs rotated signal samples.

The circular buffer 62 is configured for buffering the rotated signal samples. In particular, the beginning of a data packet is not guaranteed to be located at the same position within the sequence of rotated signal samples. Hence, the rotated signal samples are stored in the circular buffer 62 in a manner such that any data sample within a prescribed duration (e.g., one maximum-length data packet) can be located and retrieved from the circular buffer 62. Once the circular buffer 62 reaches capacity, any new signal sample to be stored in the circular buffer 62 is overwritten over the oldest stored signal sample. Hence, the circular buffer 62 enables the receiver 50 to adjust the "starting point" of the data packet within the sequence of rotated signal samples.

The Fast Fourier Transform (FFT) circuit 64 is configured for converting the time-based sequence of rotated signal samples into a frequency domain-based series of prescribed frequency points (i.e., "tones"); according to the disclosed embodiment, the FFT circuit 64 maps the rotated signal samples to a frequency domain of fifty-two (52) available tones.

In particular, the available fifty-two (52) tones are used to transport information: four (4) tones are used as pilot tones, and the remaining forty-eight (48) tones are data tones, where each tone may carry from one to six (1-6) bits of information. According to the IEEE 802.11a/g specification, the physical layer data packet should include a short training sequence, a long training sequence, a signal field (indicating the data rate and length of the payload, and coded at the lowest data rate of 6 Mbps), and the payload data symbols encoded in one of eight data rates from 6 Mbps to 54 Mbps. The FFT circuit 64 determines the data rate from the signal field, and recovers the data tones.

The FFT circuit 64 outputs a group of tone data to a buffer 66, illustrated as a first buffer portion 66a, a second buffer portion 66b, and a switch 66c: the FFT circuit 64 alternately outputs the groups of tone data between the buffer portions 66a and 66b, enabling the switch 66 to output one group of tone data from one buffer portion (e.g., 66a) while the FFT circuit 64 is outputting the next group of tone data into the other buffer portion (e.g., 66b). Note actual implementation may utilize addressing logic to execute the functions of the switch 66c.

Since certain tones output by the FFT 64 may have encountered fading due to signal attenuation and distortion on the wireless channel, equalization is necessary to correct the fading. The frequency domain equalizer 68 is configured for reversing the fading encountered by the tones in order to provide equalized tones. Channel information is obtained by the channel estimator 70 from the long training sequence in the IEEE 802.11a preamble; the channel information is used by the channel estimator 70 to estimate the channel characteristics; the estimated channel characteristics are supplied to the frequency equalizer 68 to enable equalization of each tone.

In addition to the coarse and fine frequency offset estimator 58, the phasor circuit 60 and the channel estimator 70, the receiver module 50 also includes a timing synchronization module 72, a frequency tracking block 74, a channel tracking block 76, and a timing correction block 78 for controlling signal conditioning to ensure the received signal samples are decoded properly to accurately recover the data symbols.

The decoding portion 80 includes a digital slicer module 82, a deinterleaver 84, and a Viterbi decoder 86. The digital slicer module recovers up to 6 bits of symbol data from each tone, based on the data rate specified in the signal field in the preamble. The deinterleaver 84 performs the converse operation of the transmitter interleaver circuit, and rearranges the data back into the proper sequence of deinterleaved data. The Viterbi decoder 86 is configured for decoding the deinterleaved data into decoded data, in accordance with the IEEE 802.11a specification.

The descrambler circuit 90 is configured for recovering the original serial bit stream from the decoded data, by descrambling a 127-bit sequence generated by the scrambler of the transmitter, according to the IEEE 802.11a specification. The descrambler circuit 90 utilizes a scrambling seed, recovered from the service field of the data packet by the seed estimation circuit 92, for the descrambling operation. The signal field information from the preamble also is stored in a signal field buffer 94, configured for storing the length and data rate of the payload in the data packet. Overall control of the components of the receiver 50 is maintained by the state machine 96.

Hence, the serial bit stream recovered by the descrambler circuit 90 is output to an IEEE 802.11a compliant Media Access Controller (MAC).

Coarse Frequency Estimation Based on Autocorrelation of Accumulated Samples

Figure 4:
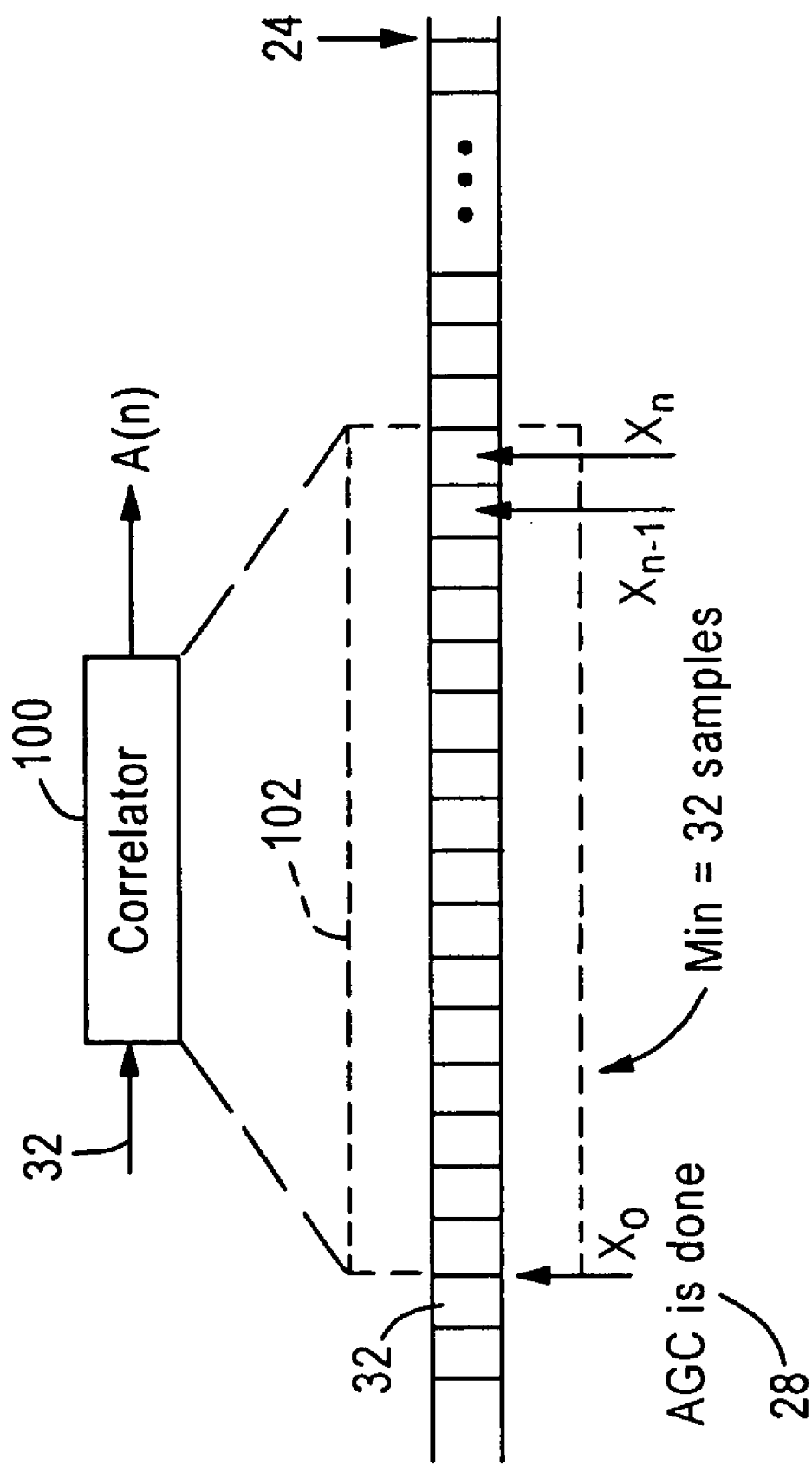
FIG. 4 is a block diagram illustrating in detail the arrangement for performing coarse frequency estimation using an accumulating correlation window, according to an embodiment of the present invention.

FIG. 4 is a diagram illustrating the arrangement for performing coarse frequency estimation in the coarse and fine frequency offset estimator 58, according to an embodiment of the present invention. The estimator 58 of FIG. 3 includes an autocorrelator 100 configured for generating a coarse frequency estimation value A(n) based on performing autocorrelation on the short preamble samples 32 using a correlation window 102. In particular, following AGC completion at event 28, the correlator 100 accumulates the received samples 32 and uses the accumulated samples for autocorrelation. The minimum window size is 32 samples, and is increased for each corresponding received sample 32. Hence, the size of the window 102 is successively increased for each corresponding received short preamble sample 102.

Hence, all the samples ($x_n$) 32 received by the OFDM receiver are used by the correlator 100 to calculate an accumulated correlation A(n), until the symbol boundary 24 is detected, according to:

$$A(n) = \sum_{k=0}^{n-k-16 \geq 0} x_{n-k} (x_{n-k-16})^* \quad (2)$$

Where the symbol "*" represents a complex conjugate (i.e., x* is the complex conjugate of x). The expression "n−k−16≧0" indicates that the size of the window 102 extends to all samples between and including $x_0$ and $x_n$.

Consequently, by averaging over more samples, the effect of noise can be minimized more effectively, providing a more accurate coarse frequency estimation result.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an OFDM direct conversion receiver, the method including:
   receiving OFDM symbols by the OFDM direct conversion receiver, including short preamble symbols each having a prescribed number of short preamble samples; and
   generating coarse frequency estimation values by the OFDM direct conversion receiver for adjustment of the OFDM symbols, each coarse frequency estimation value based on autocorrelating a corresponding accumulation of the short preamble samples by successively increasing a correlation window size for each corresponding received short preamble sample.

2. The method of claim 1, wherein the prescribed number of short preamble samples is sixteen (16), the autocorrelating including setting the correlation window size to a minimum size of thirty-two (32) samples.

3. The method of claim 1, wherein the generating step includes repeating the coarse frequency estimation, by increasing the correlation window size for each corresponding received short preamble symbol, until having detected a symbol boundary identifying an end of the short preamble symbols.

4. An OFDM direct conversion receiver configured for receiving OFDM symbols, including short preamble symbols each having a prescribed number of short preamble samples, the OFDM direct conversion receiver including:
   a coarse frequency estimation circuit configured for generating coarse frequency estimation values based on the received short preamble samples, the coarse frequency estimation circuit including a correlator configured for generating each coarse frequency estimation value based on autocorrelating a corresponding accumulation of the received short preamble samples by successively increasing a correlation window size for each corresponding received short preamble sample; and
   means for adjusting the OFDM symbols based on the coarse frequency estimation values.

5. The receiver of claim 4, wherein the prescribed number of short preamble samples is sixteen (16), the autocorrelating including setting the correlation window to a minimum size of thirty-two (32) samples.

6. The method of claim 1, wherein each accumulation includes all the short preamble samples having been received up to and including said each corresponding received short preamble sample.

7. The method of claim 6, further comprising adjusting by the OFDM direct conversion receiver the OFDM symbols based on the coarse frequency estimation values.

8. The method of claim 1, further comprising adjusting by the OFDM direct conversion receiver the OFDM symbols based on the coarse frequency estimation values.

9. The receiver of claim 4, wherein each accumulation includes all the short preamble samples having been received up to and including said each corresponding received short preamble sample.

* * * * *